(12) United States Patent  
Girlando et al.

(10) Patent No.: US 9,234,808 B2  
(45) Date of Patent: Jan. 12, 2016

(54) PASSIVE MONITORING DEVICE OF THE INNER PRESSURE IN A BLOCK OF BUILDING MATERIAL

(71) Applicant: STMICROELECTRONICS S.R.L., Agrate Brianza (IT)

(72) Inventors: Giovanni Girlando, Catania (IT); Alessandro Finocchiaro, Catania (IT); Bruno Murari, Monza (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 226 days.

(21) Appl. No.: 13/851,671

(22) Filed: Mar. 27, 2013

(65) Prior Publication Data

US 2013/0255395 A1  Oct. 3, 2013

(30) Foreign Application Priority Data

Apr. 3, 2012  (IT) .............................. MI2012A0542

(51) Int. Cl.
- *G01M 5/00* (2006.01)
- *G01L 7/16* (2006.01)
- *G01L 1/14* (2006.01)

(52) U.S. Cl.
CPC ... *G01L 1/14* (2013.01); *G01M 5/00* (2013.01)

(58) Field of Classification Search
CPC ... G01M 5/00; G01M 5/0041; G01M 5/0083; G01M 5/0091; G01L 1/14; G01L 9/0072; G01L 9/007; G01L 9/0075; G01B 7/16; G01B 15/06; G01D 21/00; Y10T 29/49103
USPC .................................. 73/744, 786; 29/621.1
See application file for complete search history.

(56) References Cited

U.S. PATENT DOCUMENTS

2004/0153270 A1    8/2004  Yamashita et al.

FOREIGN PATENT DOCUMENTS

| EP | 2469886 | 6/2012 |
|----|---------|--------|
| WO | 2011066028 | 6/2011 |
| WO | 2012084295 | 6/2012 |

*Primary Examiner* — Harshad R Patel  
*Assistant Examiner* — Brandi N Hopkins  
(74) *Attorney, Agent, or Firm* — Allen, Dyer, Doppelt, Milbrath & Gilchrist, P.A.

(57) ABSTRACT

A monitoring device is for the inner pressure distribution of building material in a building structure. The device may include planar sensing capacitors to be buried in contact with the building material, with each sensing capacitor including a pair of plates and a dielectric material layer therebetween adapted to undergo elastic deformation under pressure without deforming plastically. The device may also include a protection box to be buried in the building material, a dielectric material enclosed in the protection box, and connection terminals protruding from the protection box. Pairs of metal vias are buried in the dielectric material enclosed within the protection box, with each pair connecting the plates of a respective planar sensing capacitor to respective connection terminals.

27 Claims, 4 Drawing Sheets

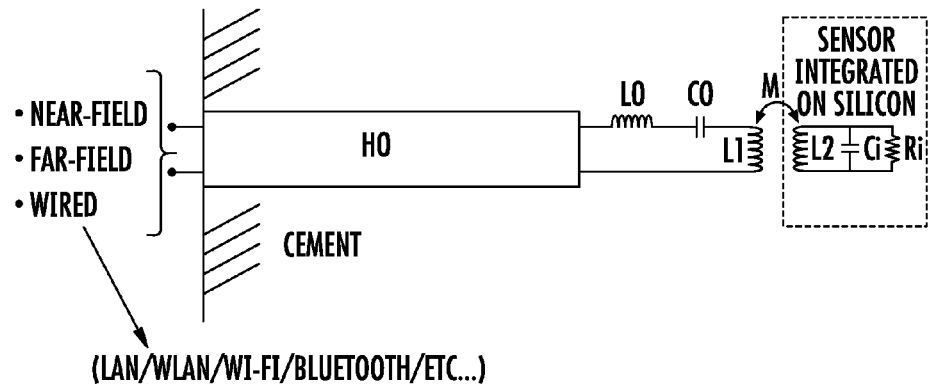
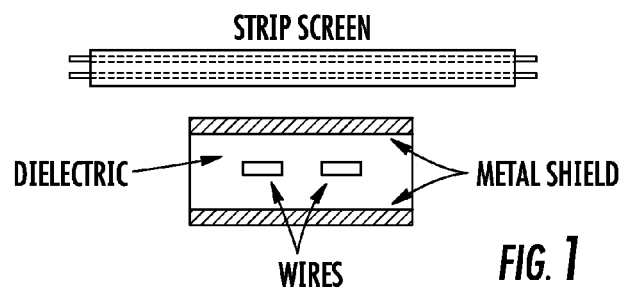
FIG. 1
*(PRIOR ART)*
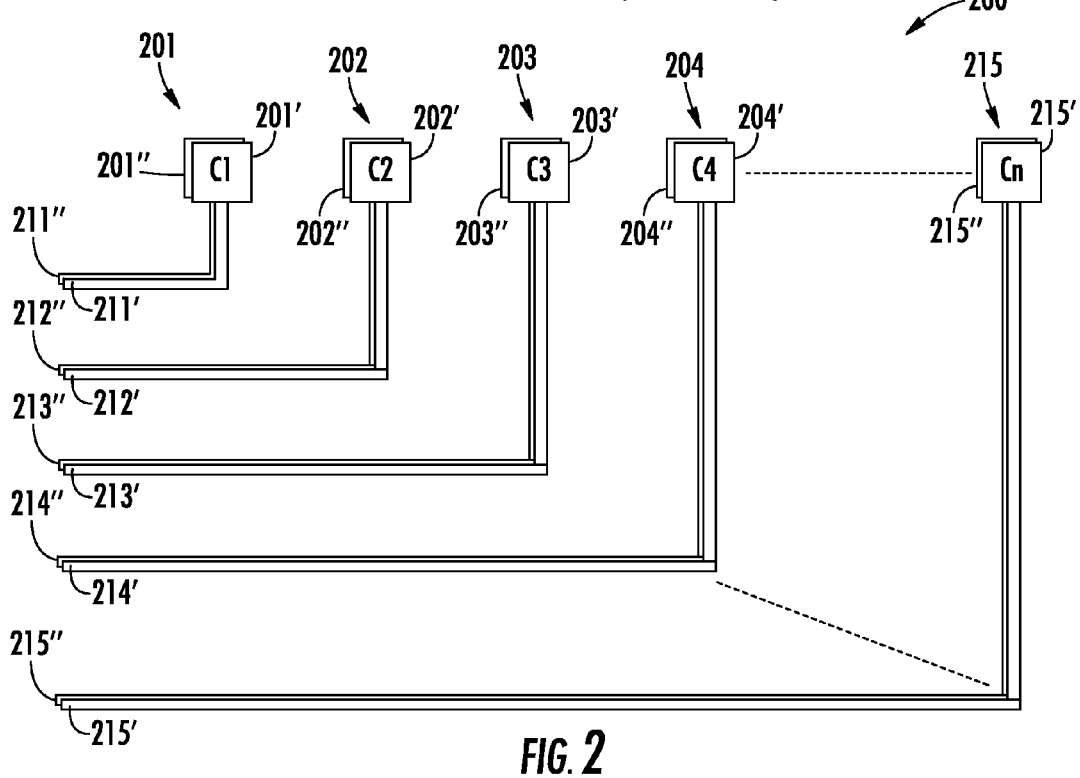
FIG. 2

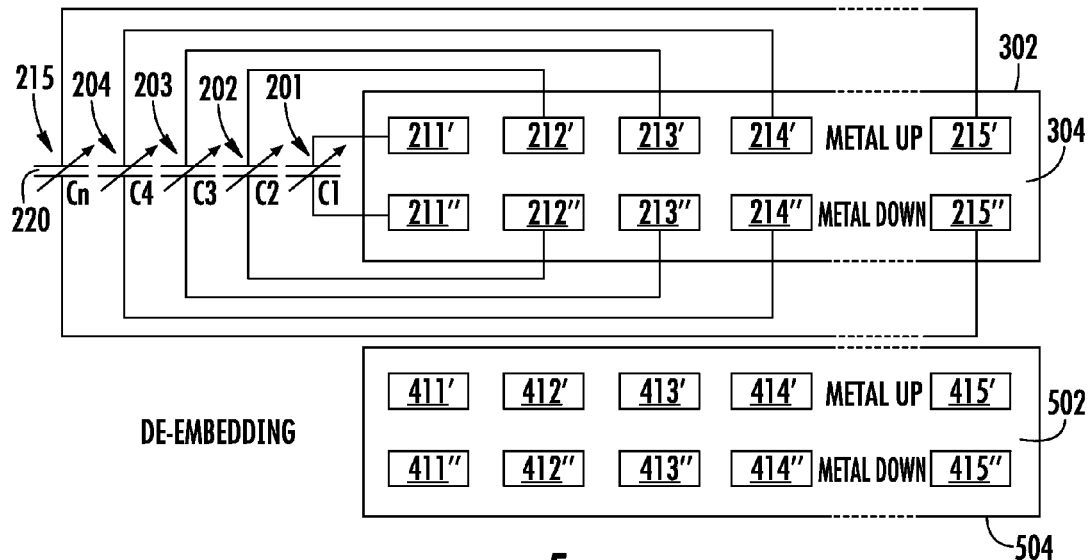
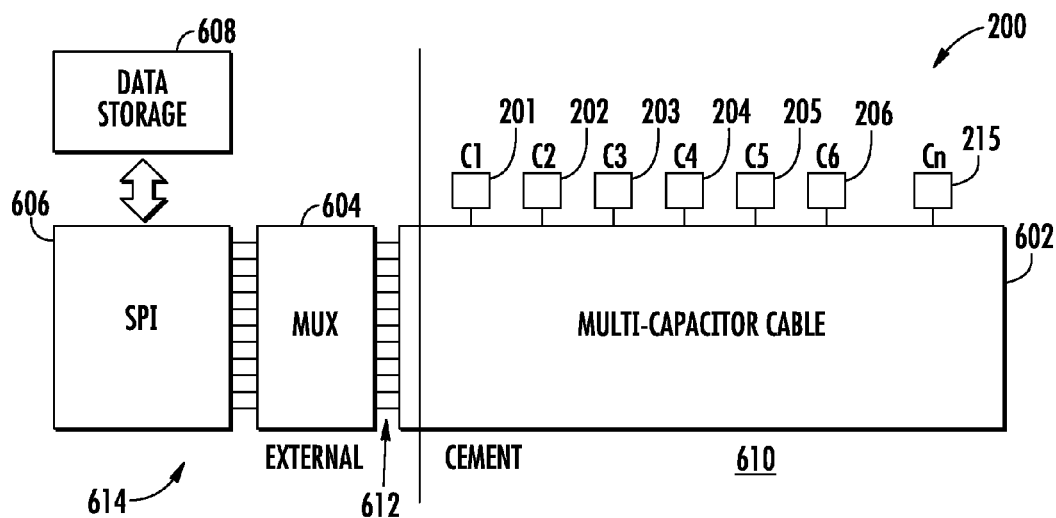

PASSIVE MONITORING DEVICE OF THE INNER PRESSURE IN A BLOCK OF BUILDING MATERIAL

FIELD OF THE INVENTION

This invention relates to monitoring devices in building structures, and, more particularly, to a passive monitoring device of the inner pressure in a block of building material of a building structure.

BACKGROUND OF THE INVENTION

The strategy for implementing damage detection and the characterization of mechanical structures is commonly called Structural Health Monitoring (SHM). Damage is defined as modifications of the material and/or of the geometrical properties of a structural system, comprising modifications of boundary conditions and connections of the system, that worsen performance of the system. The SHM process implies the observation of the mechanical system along the time using periodically: measurements of dynamic responses coming from an array of sensors, extraction of data of damage characteristics sensed from these measurements, and statistical analysis of these data of characteristics for determining the present health state of the system (also called structural analysis).

Currently, SHM systems use sensors located outside the surfaces to be controlled. For example, in bridges a number of sensors are used (anemometers for calculating the wind speed, accelerometers, extensometers, motion transducers, temperature sensors, sensors for detecting motion of weights, etc.), all placed on the external surfaces of beams, ropes or pillars, in order to: estimate the effects of loads on the bridge, evaluate the weakening of the bridge, and foresee the probable evolution of the bridge and its expected lifetime.

SHM systems with sensors buried in the structures to be monitored have been devised. These sensors (of pressure, humidity, temperature, etc.) have at least an antenna for remote power supply and for transmitting outside the block itself the measured values. Sensors of this kind are disclosed for example in the US patent application No. 2004/0153270 and in the Italian patent applications No. VA2010A000097 and MI2010A002365, the entire contents of which are incorporated herein by reference.

SUMMARY OF THE INVENTION

Tests carried out by the applicant showed that, despite the accuracy with which the known sensors to be buried in the structures to be monitored were realized, after time an unacceptable loss of accuracy of pressure measurements or even an interruption of the functioning was observed, and that made the buried sensors for monitoring the building structure useless for long periods of time.

Thorough investigations for identifying the causes of this degradation, that was inexplicable, lead to infer that electrical connections between the buried sensor and the external world are subjected to a degradation that, during the years, alters the measurements in an unpredictable manner or may even hinder a correct functioning of the sensor.

It has been understood that an approach is to realize a monitoring device with connections protected against high pressures that typically occur in building structures and with sensors adapted to be buried and to be directly in contact with the building material.

A passive monitoring device that may be buried inside a building material of a building structure and that may sense variations of the inner pressures of the building structure has been realized.

The monitoring device comprises a plurality of substantially planar sensing capacitors, directly in contact with the building material, between the plates of which there is a dielectric material adapted to undergo to elastic deformation when subjected to the inner pressures that are generated in a block of building material in a building structure. The plates of the sensing capacitors are connected to respective metal vias and the metal vias are buried in a block of dielectric material protected by a protection box, preferably made of metal, adapted to withstand without undergoing to plastic deformation, the pressures that are generated inside the building material of a building structure. Each pair of metal vias connects the plates of a respective sensing capacitor to respective connection terminals protruding out of the protection box.

According to an embodiment, the metal vias connected to the plates of a same capacitor run through the dielectric material one parallel to the other at a substantially constant mutual distance.

According to another embodiment, the metal vias protrude out of the building material such to form read terminals outside the building structure of the value of the capacitors.

According to another embodiment, the free ends of the metal vias are coupled to a read circuit of the value of these capacitors which, in turn, are buried in the building material and equipped with means or circuitry for transceiving data with the external world.

BRIEF DESCRIPTION OF THE DRAWINGS

FIG. 1 shows a shielded line that supplies a monitoring circuit buried in a building material, disclosed in the patent application No. VA2010A000097.

FIG. 2 schematically depicts a passive monitoring device of this invention having a plurality of plane capacitors, the plates of which are connected to respective metal vias.

FIG. 5 shows the passive monitoring device of FIG. 3 and a second protection box that contains de-embedding vias of FIG. 3 buried in a block of dielectric material.

FIG. 6 depicts the passive monitoring device of FIG. 3 embedded in a structure of building material, connected to an external read circuit for reading the value of the buried capacitors.

DETAILED DESCRIPTION OF THE PREFERRED EMBODIMENTS

A structure of the passive monitoring device 200 of the pressure distribution inside a block of building material is schematically shown in FIG. 2. The monitoring device 200 comprises a plurality of planar capacitors for sensing pressure C1 201, C2 202, C3 203, C4 204, Cn 215, buried in the building material between the plates of which there is a dielectric material 220 that undergoes elastic deformation at the typical pressures that are generated inside a building structure. Each plate 201', 201", 202', 202", 203', 203", 204', 204", 215', 215" of the respective pressure sensing capacitors C1 201, C2 202, . . . , Cn 215 is connected to a respective metal via 211', 211", 212', 212", 213', 213", 214', 214", 215', 215". Preferably but not necessarily, the metal vias of a same capacitor are in parallel at a substantially constant mutual distance.

When the pressure inside the building material varies, also the pressure on the two plates of the capacitors varies and, as a consequence, the mutual distance between them because of the elastic deformation of the interposed dielectric 220 varies. This causes a variation of the capacitance of the capacitor, that is inversely proportional to the distance between the plates.

Tests showed that it is possible to use elastomers or even plastic material capable of deforming elastically up to pressures of 500 atmospheres, in order to realize planar capacitors for sensing pressure subjected to a variation greater than 60% of their capacitance when the pressure on the plates varies from 1 atm to 500 atm.

Figure 3:
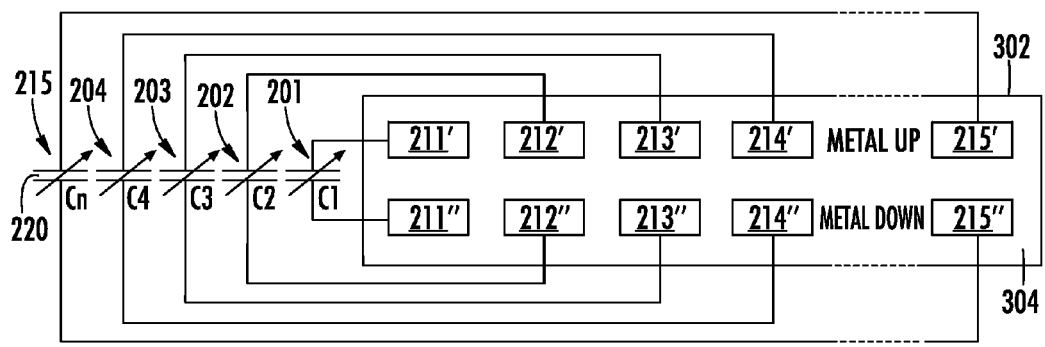
FIG. 3 is a sectional view of the passive monitoring device in which the metal vias are buried in a dielectric material enclosed in a protection box.

The metal vias 211', 211" . . . , 215', 215" for connecting the plates 201', 201" . . . , 215', 215" of the pressure sensing capacitors C1 201, C2 202, . . . , Cn 215 are immersed in a dielectric material 304 which, in turn, is protected by a protection box 302, preferably made of metal, as shown in FIG. 3, adapted to withstand the great pressures inside a building material of a building structure. As a consequence, even in the presence of relevant variations of the inner pressure in the building structure, the metal vias coupled to the plates of the sensing capacitors will not be damaged and will undergo at most elastic deformations.

To measure the capacitance of the sensing capacitors C1 201, C2 202, . . . , Cn 215 and thus the pressure in the building structure, a read circuit 614 for reading the capacitance will be connected to the free terminals 612 of the metal connection vias. This read circuit 614 will read the overall capacitance of each capacitor and of the vias connected thereto. The metal vias 211', 211" . . . , 215', 215" are buried in the dielectric 304 and are shielded by a protection box 302 adapted to withstand the pressures that are generated in the building material without undergoing to plastic deformations. Thus eventual variations of the capacitance of the vias will be negligible with respect to the variation of capacitance of the sensing capacitors, that, by contrast, are directly in contact with the building material.

Figure 4:
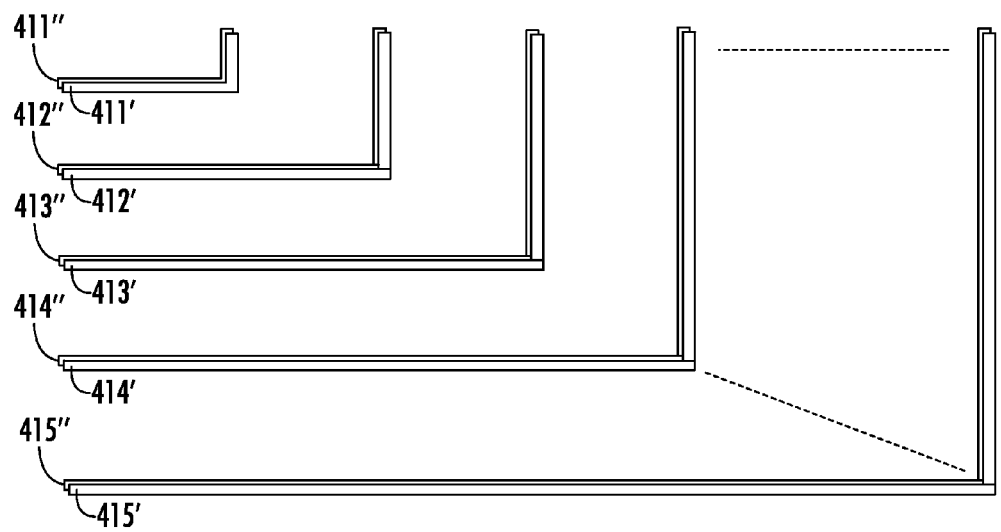
FIG. 4 depicts de-embedding metal vias identical to the metal vias connected to the sensing capacitors of FIG. 3.

With relatively long metal vias, as could be the case in monitoring devices of large building structures, variation of capacitance of the vias due to elastic deformations could introduce unacceptable systematic measurement errors. In this case, conveniently the monitoring device will have non connected de-embedding metal vias 411', 411", 412', 412", 413', 413", 414', 414", 415', 415", as shown in FIG. 4, identical to those connected to the plates of the sensing capacitors. Therefore, the capacitance of each sensing capacitor will be derived by taking into account, for example, by difference, also the capacitances of the corresponding de-embedding vias 411', 411" . . . , 415', 415".

According to an alternative embodiment shown in FIG. 5, the de-embedding vias 411', 411" . . . , 415', 415" are buried in the dielectric 502 and enclosed in a protection box 504, preferably made of metal, distinct from the protection box 302 that encloses the vias 211', 211" . . . , 215', 215" connected to the sensing capacitors C1 201, C2 202, . . . , Cn 215.

The passive monitoring device 200 of pressure may be buried in the building material 610 of a structure, as shown in FIG. 6. The free ends 612 of the metal vias e-coupled to the plates of the pressure sensing capacitors may protrude out of the building material 610 and be coupled to a read circuit 614 comprising a coupling multiplexer MUX 604 coupled to a serial-parallel interface (SPI) 606, adapted to sense the values of the capacitances of the sensing capacitors C1 201, C2 202, C3 203, C4 204, C5 205, C6 206, Cn 215 and to transfer them in a serial manner to a device capable of storing these values in a dedicated memory DATA STORAGE 608.

Figure 7:
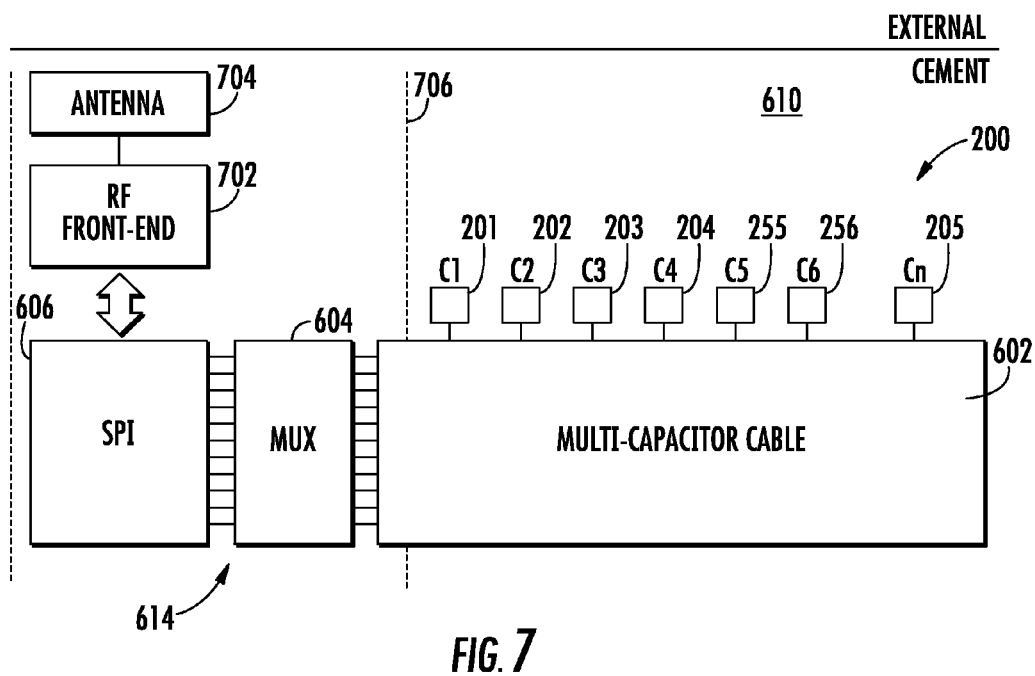
FIG. 7 depicts the passive monitoring device of FIG. 4 buried inside a structure of building material together with a read circuit for reading the value of the buried capacitors and for transceiving data with the external world.

According to another embodiment shown in FIG. 7, the passive monitoring device 200 is buried in the building material 610 together with the read circuit 614, comprising the multiplexer/demultiplexer MUX 604 and the serial-parallel interface SPI 606. Conveniently, the read circuit 614 in this case will be equipped with a data transceiving antenna 704 buried in the building material. In this case, the antenna 704 and the blocks RF-Front-End 702, SPI 606, MUX 604 may be protected by a non metallic and hermetic protection box 706, represented by the dashed rectangle in FIG. 7, to not affect the correct functioning of the antenna.

Appropriate non metallic materials for realizing protection boxes are, for example, PVC, nylon, teflon, plexiglas, rubber. Materials that are suitable for the plates of the sensing capacitors C1 201, C2 202, . . . , Cn 215 are Aluminum and Copper. Materials particularly appropriate to define the dielectric layer of the pressure sensing capacitors are silicones, polyesters and polyurethanes.

That which is claimed:

1. A monitoring device of inner pressure distribution of building material in a building structure, comprising:
    a plurality of planar sensing capacitors adapted to be buried in contact with the building material, each planar sensing capacitor comprising a pair of plates and a dielectric material layer therebetween adapted to undergo elastic deformation under pressure in the building material without deforming plastically;
    a protection box adapted to be buried in the building material and to withstand pressures without undergoing plastic deformation;
    a dielectric material enclosed in said protection box;
    connection terminals protruding from said protection box; and
    a plurality of pairs of metal vias buried in the dielectric material enclosed within said protection box, each of said pairs of metal vias coupling the pair of plates of a respective planar sensing capacitor positioned outside of said protection box to respective connection terminals.

2. The monitoring device according to claim 1, wherein respective metal vias of a same pair run in said dielectric material parallel to one another at a constant mutual distance.

3. The monitoring device according to claim 1, further comprising, for each pair of metal vias, a corresponding identical pair of de-embedding vias not being connected to any sensing capacitor, buried in said dielectric material; and additional connection terminals protruding out of said protection box and coupled to said de-embedding vias.

4. The monitoring device according to claim 1, further comprising an additional protection box; additional dielectric material enclosed in said additional protection box; additional connection terminals protruding out of said additional protection box; and, for each pair of metal vias, a corresponding identical pair of de-embedding vias not being connected to any sensing capacitor, buried in said additional dielectric material, and coupled to said additional de-embedding vias.

5. The monitoring device according to claim 1, further comprising a read circuit configured to be coupled to said connection terminals and read values of said planar sensing capacitors.

6. The monitoring device according to claim 5, wherein said read circuit comprises:
- a serial-parallel interface adapted to perform capacitance measurements;
- a multiplexer functionally coupled between said serial-parallel interface and said connection terminals; and
- a storage memory functionally coupled to said serial-parallel interface to store the capacitance measurements.

7. The monitoring device according to claim 5, wherein said read circuit is adapted to be buried in the building material and comprises an antenna configured to receive remote power and transmit data.

8. The monitoring device according to claim 1 wherein the plates comprise at least one of aluminum and copper; and wherein the dielectric material layers comprise at least one of silicones, polyesters and polyurethanes.

9. The monitoring device according to claim 1, wherein said protection box comprises metal.

10. A monitoring device for building material in a building structure, comprising:
- a plurality of sensing capacitors adapted to be buried in the building material, each sensing capacitor comprising a pair of plates and a dielectric material layer therebetween;
- a protection box adapted to be buried in the building material;
- a dielectric material enclosed in said protection box;
- connection terminals extending from said protection box; and
- a plurality of pairs of metal vias buried in the dielectric material enclosed within said protection box, each of said pairs of metal vias coupling the pair of plates of a respective sensing capacitor positioned outside of said protective box to respective connection terminals.

11. The monitoring device according to claim 10, wherein respective metal vias of a same pair run in said dielectric material parallel to one another at a constant mutual distance.

12. The monitoring device according to claim 10, further comprising, for each pair of metal vias, a corresponding identical pair of de-embedding vias not being connected to any sensing capacitor, buried in said dielectric material; and additional connection terminals extending from said protection box and coupled to said de-embedding vias.

13. The monitoring device according to claim 10, further comprising an additional protection box; additional dielectric material enclosed in said additional protection box; additional connection terminals extending from said additional protection box; and, for each pair of metal vias, a corresponding identical pair of de-embedding vias not being connected to any sensing capacitor, buried in said additional dielectric material, and coupled to said additional de-embedding vias.

14. The monitoring device according to claim 10, further comprising a read circuit configured to be coupled to said connection terminals and read values of said sensing capacitors.

15. The monitoring device according to claim 14, wherein said read circuit is adapted to be buried in the building material and comprises an antenna configured to receive remote power and transmit data.

16. The monitoring device according to claim 14, wherein said read circuit comprises:
- a serial-parallel interface adapted to perform capacitance measurements;
- a multiplexer functionally coupled between said serial-parallel interface and said connection terminals; and
- a storage memory functionally coupled to said serial-parallel interface to store the capacitance measurements.

17. The monitoring device according to claim 10 wherein the plates comprise at least one of aluminum and copper; and wherein the dielectric material layers comprise at least one of silicones, polyesters and polyurethanes.

18. The monitoring device according to claim 10, wherein said protection box comprises metal.

19. A method for monitoring building material in a building structure, comprising:
- burying a plurality of sensing capacitors in the building material, each sensing capacitor comprising a pair of plates and a dielectric material layer therebetween;
- burying a protection box in the building material with a dielectric material enclosed in the protection box, connection terminals extending from the protection box, and a plurality of pairs of metal vias buried in the dielectric material enclosed within the protection box, each of the pairs of metal vias coupling the pair of plates of a respective sensing capacitor positioned outside of said protection box and to respective connection terminals; and
- reading values of the plurality of sensing capacitors from the connection terminals.

20. The method according to claim 19, wherein respective metal vias of a same pair run in the dielectric material parallel to one another at a constant mutual distance.

21. The method according to claim 19, further comprising, for each pair of metal vias, a corresponding identical pair of de-embedding vias not being connected to any sensing capacitor, buried in the dielectric material; and additional connection terminals extending from the protection box and coupled to the de-embedding vias.

22. The method according to claim 19, further comprising an additional protection box; additional dielectric material enclosed in the additional protection box; additional connection terminals extending from the additional protection box; and, for each pair of metal vias, a corresponding identical pair of de-embedding vias not being connected to any sensing capacitor, buried in the additional dielectric material, and coupled to the additional de-embedding vias.

23. The method according to claim 19, wherein reading comprising reading using a read circuit coupled to the connection terminals.

24. The method according to claim 23, wherein the read circuit comprises:
- a serial-parallel interface adapted to perform capacitance measurements;
- a multiplexer functionally coupled between the serial-parallel interface and the connection terminals; and
- a storage memory functionally coupled to the serial-parallel interface to store the capacitance measurements.

25. The method according to claim 24, wherein the read circuit is buried in the building material and comprises an antenna configured to receive remote power and transmit data.

26. The method according to claim 19, wherein the plates comprise at least one of aluminum and copper; and wherein the dielectric material layers comprise at least one of silicones, polyesters and polyurethanes.

27. The method according to claim 19, wherein the protection box comprises metal.

* * * * *